United States Patent [19]

Wiseman, Jr. et al.

[11] 4,286,694
[45] Sep. 1, 1981

[54] GROOVED CARBON BRAKE DISCS

[75] Inventors: Roy R. Wiseman, Jr.; James J. Kovac, both of Akron, Ohio

[73] Assignee: Goodyear Aerospace Corporation, Akron, Ohio

[21] Appl. No.: 39,489

[22] Filed: May 16, 1979

Related U.S. Application Data

[63] Continuation of Ser. No. 639,391, Dec. 10, 1975, abandoned, which is a continuation of Ser. No. 223,949, Feb. 7, 1972, abandoned.

[51] Int. Cl.³ .............................................. F16D 55/36
[52] U.S. Cl. ................................... 188/71.5; 188/71.6; 188/73.2; 188/218 XL; 188/251 A; 188/264 AA; 192/70.14; 192/107 M; 192/113 A
[58] Field of Search .............. 188/71.6, 73.2, 218 XL, 188/251 M, 251 A, 264 A, 264 AA, 264 E; 192/107 M, 107 R, 70.14, 113 A

[56] References Cited

U.S. PATENT DOCUMENTS

| 2,743,792 | 5/1956 | Ransom | 188/264 A X |
| 2,954,853 | 10/1960 | Maierson et al. | 192/107 M X |
| 3,063,531 | 11/1962 | Aschauer | 188/264 E X |
| 3,161,260 | 12/1964 | Benini | 192/113 A X |
| 3,552,533 | 1/1971 | Nitz | 192/70.14 X |
| 3,692,150 | 9/1972 | Ruppe, Jr. | 188/251 A X |

Primary Examiner—George E. A. Halvosa
Attorney, Agent, or Firm—P. E. Milliken; E. W. Oldham

[57] ABSTRACT

Brake discs of carbon or other porous material in which the opposed faces of the discs are provided with shallow grooves extending between the inner and outer circumferences to vent steam and other gases generated during braking. The grooves of the stationary discs may be at different angles relative to the radii than are the grooves of the rotating discs.

6 Claims, 5 Drawing Figures

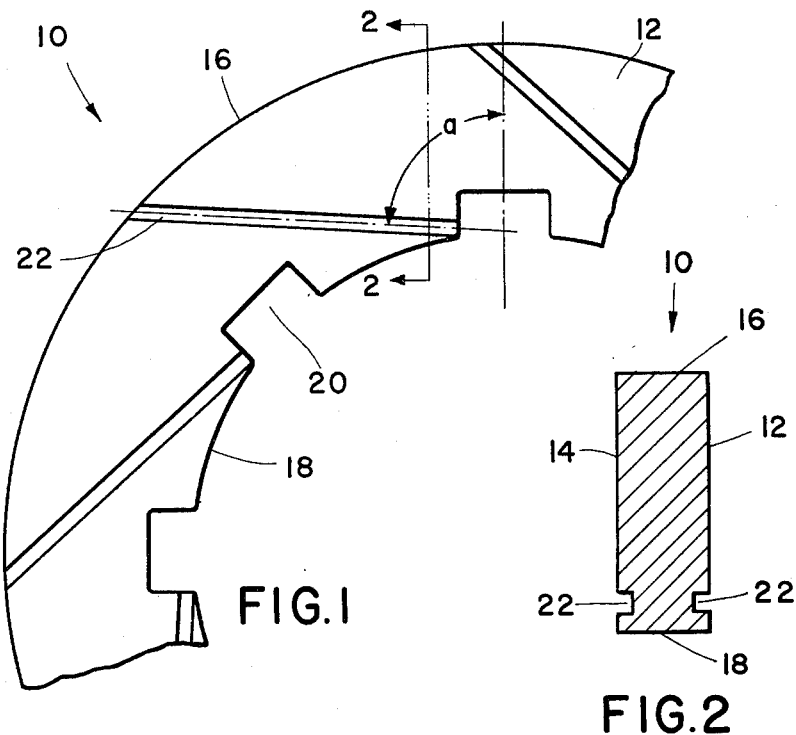
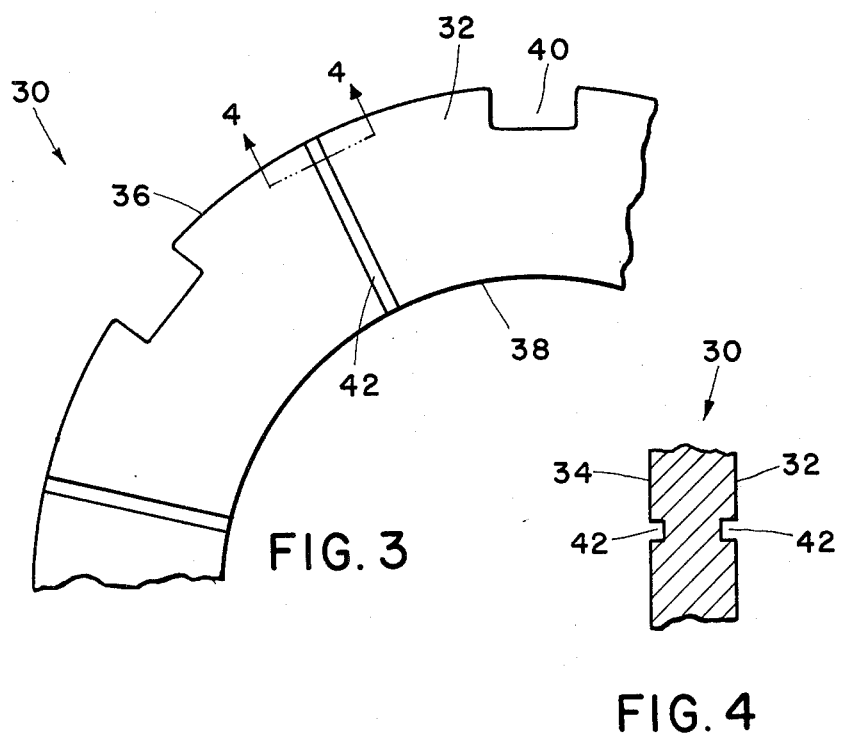

GROOVED CARBON BRAKE DISCS

This is a continuation of application Ser. No. 639,391, filed Dec. 10, 1975, which in turn is a continuation of application Ser. No. 223,949, filed Feb. 7, 1972, both now abandoned.

This invention relates to brake assemblies of the type having alternate rotating and stationary brake discs carried and axially movable between a backing plate and a pressure plate. More particularly the invention relates to a brake disc made of porous material such as carbon-carbon composite material for use in such an assembly.

When water is present in a brake disc assembly a substantial decrease in braking torque occurs. This decrease is the result of a loss of friction coefficient due to the build up of steam between the opposing brake discs. At the inception of braking, a wetted brake may exhibit a coefficient of friction of 10% that of a dry brake. Immediately after the inception of braking the coefficient of friction may continue to decrease to 5% that of a dry brake and remain at this level until the moisture present in the brake assembly is driven off. Increased stopping time and distance is thus required.

It is the primary object of the present invention to provide a porous material brake disc which has superior braking characteristics when wetted than do conventional discs and which has a faster recovery rate.

It is also an object of the invention to provide a porous material brake disc which is provided with means for rapidly venting steam or other gases generated between the brake discs during braking action.

The above and other objects of the invention which will become apparent in the following detailed description are achieved by providing grooves on the rubbing surface of a carbon based or other porous material brake disc, the grooves extending between the inner and outer circumferences of the disc. Such grooves, which may be spaced at intervals on the disc, serve to provide venting paths for steam or gas which develops during braking action thereby permitting the more rapid drying of the brake and providing improved face control to substantially reduce loss of braking torque.

For a more complete understanding of the invention and the objects and advantages thereof reference should be had to the following detailed description and the acoompanying drawing wherein there is shown a preferred embodiment of the invention.

In the drawing:

FIG. 1 is a fragmentary elevational view of a stationary disc constructed in accordance with the present invention;

FIG. 2 is a sectional view taken along the line 2—2 of FIG. 1;

FIG. 3 is a fragmentary elevational view of a rotating disc constructed in accordance with the present invention;

FIG. 4 is a fragmentary sectional view taken along the line 4—4 of FIG. 3 and

Figure 5:
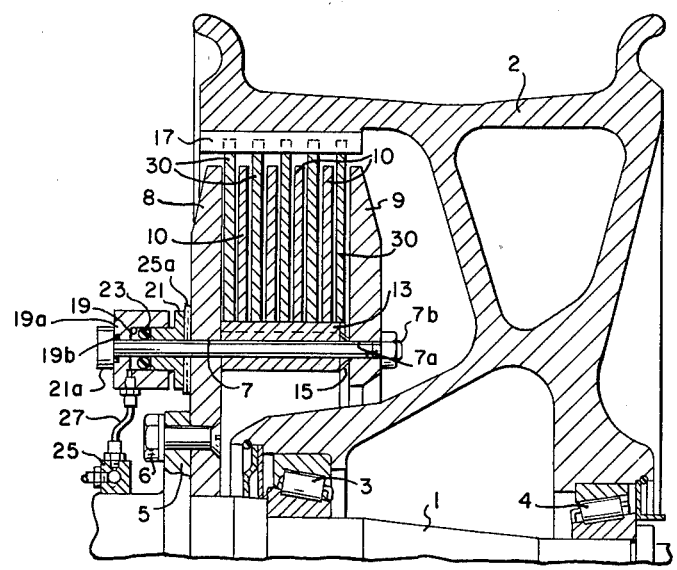
FIG. 5 is a sectional view of a wheel and axle with a brake embodying the present invention, parts being broken-away, and parts shown in section.

Referring to FIG. 5 of the drawing, this shows a non-rotatable axle 1, about which a wheel 2 is mounted for rotation on bearings 3 and 4. The axle is formed with a radial torque flange 5 to which a torque and pressure plate 8 is secured by bolts 6 evenly spaced thereabout. A back plate 9 is provided opposite the pressure plate 8. The plates 8 and 9 are provided with axially aligned openings 7 and 7a at spaced intervals circumferentially thereof to receive a selected number of assembly bolts 7b spanning the space therebetween. Each bolt 7b extends through holes in a hub-like tubular torque tube 13 normally shorter than the space between the plates 8 and 9, and a spring washer or Bellville-type washer 15 is placed about each bolt between one of the pressure plates and the torque tube for the purpose of holding the plates in spaced-apart relation and returning them to such position after a braking action. The torque tube 13 is usualy bolted by a bolt (not shown) to the torque plate 8 at a point circumferentially between the bolts 7b. Between the pressure plate 8 and back plate 9 are a plurality of rotating brake disks 30, for example, each having outer peripheral notches at spaced intervals thereabout for receiving keys 17 carried by the wheel 2, the brake disks 30 being arranged to float axially of the wheel along the keys. Also, between plates 8 and 9 are stationary brake disks 10, alternately arranged between brake disks 30, and having notches in their inner peripheries for keyed engagement with splines on torque tube 13 to prevent the rotation, but allowing axial flotation.

For applying braking pressure to the disk stack, any convenient means to press the plates 8 and 9 towards each other to thus slide the disks 10 and 30 into frictional braking engagement will meet the objects of the invention. One simple arrangement to this end would be by the pressure applying means taught by U.S. Pat. No. 3,038,559, also assigned to the same assignee of the instant application. In essence, this system utilizes a circumferential cylinder 19 formed in a collar 19a with an annular piston 21 slidably mounted about a bolt 21a within the cylinder. The cylinder and piston are mounted between the pressure plate 8 and bolt head 21a. For sealing the cylinder 19, a seaing ring 19b is mounted between the collar 19a and the bolt, and a sealing ring 23 is mounted against the piston 21 within cylinder 19. For providing pressure to the cylinder 19, an annular manifold 25 may be provided about axle 1 and may be supplied by a pipe from a control valve (not shown). Flexible conduits 27 individual to the cylinders 19 connect the cylinders 19 to the manfold 25.

A stationary disc, designated generally by the reference numeral 10, is shown in FIGS. 1 and 2. This disc is formed of a porous material, for example, of a carbon or carbon composite material and has opposed rubbing surfaces 12 and 14. The outer circumference 16 of the disc is continuous while the inner circumference 18 is provided in uniformly spaced intervals with notches 20 for receiving the splines of the torque tube of the brake assembly.

Each of the rubbing faces 12 and 14 of the disc 10 is provided with a number of grooves 22 extending across the disc between the outer and inner diameters 16 and 18. The grooves 22 are preferably located at uniformly spaced intervals about the circumference of the disc 10. As will be discussed more fully below, these grooves 22 serve to provide venting passages permitting the escape of generated gas and steam during braking action.

A rotating brake disc 30 is shown in FIGS. 3 and 4. This disc is again formed of a carbon or carbon composite material and has opposed rubbing faces 32 and 34. The radially outer periphery 36 of the disc is provided at uniformly spaced intervals with notches 40 for engaging the splines of the wheel assembly. The inner periphery 38 of the disc 30 is continuous.

Each of the wear faces 32 and 34 of the disc 30 is provided with a number of grooves 42 extending between the inner and outer peripheries of the disc. Again, these grooves are preferably uniformly spaced about the disc.

It should be noted that the grooves 22 and 42 of the stationary and rotating discs, respectively, are angled relative to one another. For example, the grooves 42 may extend radially across the rotating disc while the grooves 22 of the stationary disc extend at an angle a to the radius. Typically, this angle may be approximately 87°. The depth and width of the grooves may vary according to the size, thickness, and resultant use of the discs. We have found that the depth of the grooves should probably extend to at least the depth of the wearing surface of the disc. The base of the grooves may be defined by a squared, slanted, or tapered configuration, but they will typically utilize a simple or compound radius between the bottom and sides of the grooves to eliminate potential stress or crack points.

In a brake assembly alternate rotating discs 30 and stationary discs 10 are arranged in a stack between a fixed backing plate and a pressure plate. Upon actuation of the brake the rotating and stationary discs are pressed together. If there is moisture present in the brake assembly the heat generated by the rubbing of the rotating discs across the stationary disc produces steam and gas. The passages 22 and 42 provide exit paths for this generated steam and gas so that the brake discs can have good frictional engagement with one another. It has also been found that improved coefficient is achieved between the slotted stationary and rotating discs when the discs are not wetted. This may be due to the rapid escaping of gases generated during braking which result from the small amount of moisture carried by the discs in a humid atmosphere.

The number of slots provided on each disc together with the slot dimensions and angular relationships may be varied. In the illustrated embodiment of the invention eight (8) grooves are provided on each face of the disc. However, a larger or smaller number may be provided depending, in part, upon the size of the disc.

While only the best known embodiment of the invention has been illustrated and described in detail herein it will be understood that the invention is not so limited thereto or thereby. Reference should therefore be had to the appended claims in determining the true scope of the invention.

What is claimed is:

1. A disc brake having a stack of alternate rotating and stationary annular discs having torque transfer notches therein extending across the full width of the disc carried between a backing plate and a pressure plate, said discs operating in the earth's atmosphere, comprising:

each annular disc being of substantially uniform thickness across their full width and formed of a carbon based material capable of absorbing water and having a plurality of grooves extending across at least one of the rubbing faces of the disc, each groove extending the full distance between the inner and outer peripheries of the disc to transfer water-based steam and vaporized gasses emanating from the disc material from between adjacent discs caused by heating during a braking action, the grooves being located at spaced intervals around the disc, each groove in at least alternating discs extending at a large angle from a radius thereof.

2. The disc brake according to claim 1 wherein the depth of the grooves is at least to the depth of the predetermined wearing surface of the disc, and where said grooves have a curved configuration between the sides and bottom of the grooves.

3. The disc brake according to claim 1 wherein the grooves are located at uniformly spaced intervals and all of the grooves on the same surface of a disc have the same orientation relative to radii passing through the intersection of the groove and the inner periphery of the disc.

4. The disc brake according to claim 3 wherein the grooves of alternate ones of the discs have different orientation, and are in face-to-face relationship.

5. The disc brake according to claim 4, wherein the grooves of the first disc of a face-to-face pair of discs extend radially across the disc while the grooves of the other disc is angled relative to the radii, and all face-to-face disc pair relationships are the same.

6. The disc brake according to claim 5 wherein the last-mentioned grooves extend at angles of approximately 87° relative to the radii.

* * * * *